July 9, 1935.     R. STEVENSON     2,007,387
SPRING SHACKLE
Filed June 20, 1932
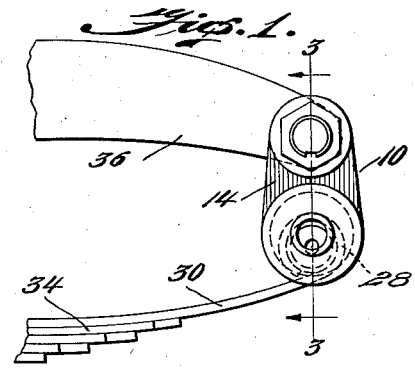
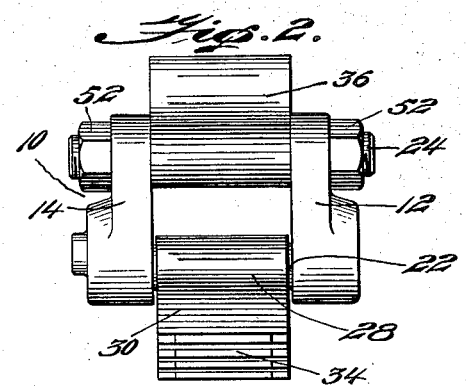
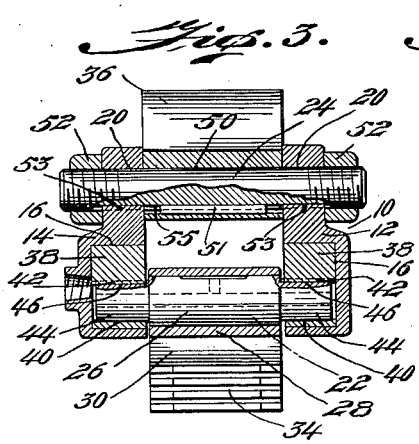
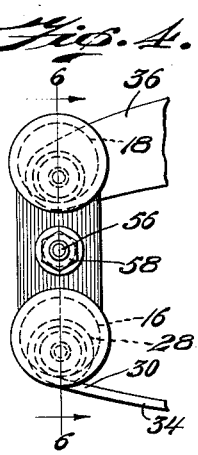
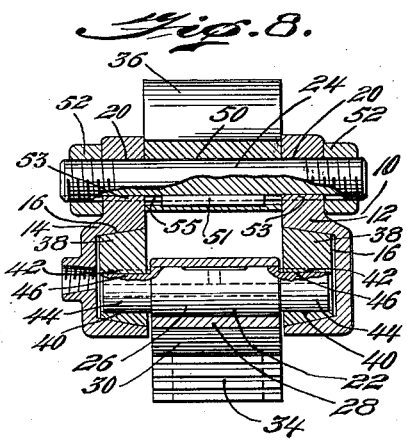
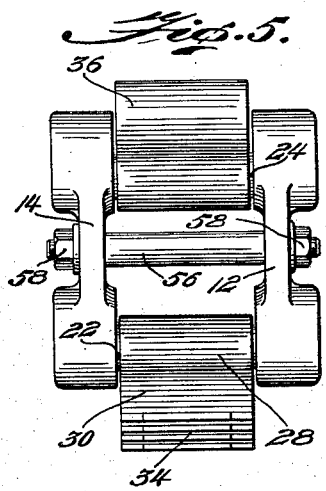
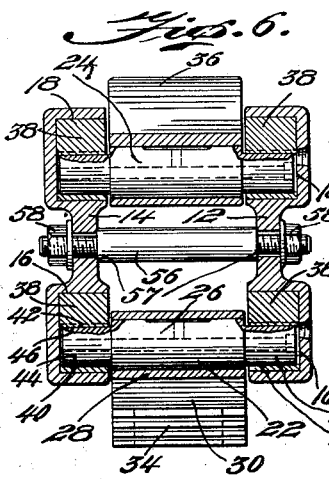
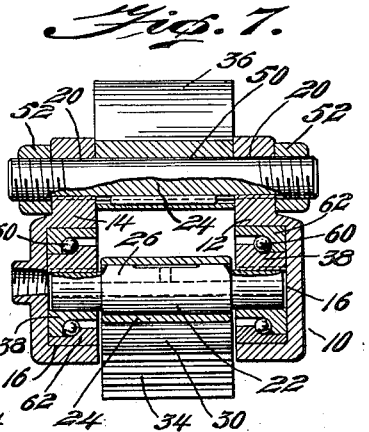
Inventor
Robert Stevenson
By Thomas A. Jenckes
Attorney Patented July 9, 1935

2,007,387

UNITED STATES PATENT OFFICE 2,007,387

SPRING SHACKLE

Robert Stevenson, West Barrington, R. I.

Application June 20, 1932, Serial No. 618,246

3 Claims. (Cl. 267—54)

My invention relates to improvements in vehicle spring shackles. An object of my invention is to provide a spring shackle which will provide the desired relative resilient movement between the chassis and the spring, constructed of a minimum number of simple parts. Most shackles on the market today have the upper shackle pintle pivotally mounted on either the upper leaf spring or a protruding portion of the vehicle chassis and the lower shackle pintle pivotally secured to the lower leaf spring thereby providing some sort of a pivotal movement. It has been found in practice, however, that this type of a shackle gives too much of a pivoting movement between the chassis and the spring and various devices have been provided to limit this pivotal movement. In certain instances push-back buffer springs adapted to abut the shackle plates themselves have been provided and in other instances rubber shackles have been provided. My invention, therefore, aims to provide a shackle which will permit the desired limited amount of pivotal movement and at the same time present a certain amount of friction to this pivotal movement, so as to act in addition as a thrust bearing to take up some of the shock of pivotal movement rather than having it all transmitted to the spring or chassis. I, therefore, mount at least the lower pintle eccentrically on cylindrical bearings mounted on the shackle side plates. Due to the eccentricity of the pintle mountings in these bearings, it is obvious that the spring end may swing the amount of eccentricity that the pintle is mounted eccentric of its cylindrical bearings and at the same time that the bearings themselves may act as thrust bearings to take up a certain amount of that thrust with their attendant friction against their respective bearing holes. If desired, the upper shackle pintle may also be mounted eccentrically on cylindrical bearings, so as to double the amount of swinging or pivotal movement inherently present. Employing either one of these constructions, however, it is obvious that I largely eliminate the present-day shock in starting or stopping due to the free pivotal movement of former types of shackles and tend to eliminate wobbling in the spring itself, thereby making easier riding and when employed in the front wheels largely eliminate some of the shimmy.

A further object of my invention is to eliminate the buffer springs hitherto thought necessary to accomplish these purposes.

A further feature of my invention is to largely eliminate the wear which took place in the pivotal mountings in former shackles as all the wear takes place in the especially constructed bearings, rather than all along the pintle. It is also apparent that employing the double eccentric construction the swinging movement is twice as great due to the eccentricities of each of the mountings of the pintles in their bearings.

These and such other objects of my invention as may hereinafter appear will be best understood from a description of the embodiments thereof shown in the accompanying drawing.

In the drawing, Fig. 1 is a side elevation of an embodiment of my improved shackle mounted on the front end of an automobile between the usual projecting chassis part and the front leaf spring.

Fig. 2 is a front elevation thereof.

Fig. 3 is a sectional view thereof taken along the line 3—3 of Fig. 1.

Fig. 4 is a side elevation of an additional embodiment of my invention employing two eccentric mountings mounted on the rear end of an automobile between the respective projecting chassis part and the rear end of the leaf spring.

Fig. 5 is a rear elevation of the embodiment shown in Fig. 4.

Fig. 6 is a sectional view of said embodiment taken along the line 6—6 of Fig. 4.

Fig. 7 is a sectional view similar to Fig. 3 of an embodiment of my invention employing a single eccentrically mounted lower pintle, in which the bearings thereof contain ball bearings.

Fig. 8 is a sectional view similar to Fig. 3 of an embodiment of my invention similar to that shown in Fig. 3 employing, however, tapered thrust bearing holes and tapered thrust bearings.

In the drawing, wherein like characters of reference indicate like parts throughout, 10 generally indicates an improved shackle constructed in accordance with my invention. Said shackle includes the side shackle plates 12 and 14, each having aligned cylindrical bearing holes 16 in the lower end thereof and in the embodiment shown in Figs. 4-6 aligned cylindrical bearing holes 18 in the upper end thereof. In the embodiments shown in Figs. 1-3 and 7 the upper ends of said side shackle plates are provided with the cylindrical bolt holes 20. I provide the lower shackle pintle 22 and the upper shackle pintle 24. In all embodiments the lower shackle pintle 22 is adapted to be secured to a spring end preferably pivotally. The center portion 26 of the pintle may be enlarged and is adapted to have a loop 28 on the end of the spring to pivotally secure the spring end 30 thereto. In the embodiment shown the spring end 30 is the end of the usual leaf chassis supporting spring 34.

In order to provide thrust bearings and to permit a swinging movement of the spring end 30 relative to the projecting chassis portion 36 I provide the lower cylindrical bearings 38 adapted to revolve in the cylindrical bearing holes 16 and having eccentrically disposed holes 40 similarly disposed on opposite bearings 38 having key means 42 therein adapted to register in the groove or spline means 46 in the ends 44 of the lower pintle 22 thus providing for detachable securement of said cylindrical bearings 38 on the ends of said lower pintle so that the pintle will be similarly eccentrically mounted on each of the respective bearings 38. In the embodiment shown in Fig. 6 the upper pintle 24 is similarly eccentrically mounted on the cylindrical bearings 38 within the upper bearing holes 18 and has the projecting end 36 of the chassis secured thereto. In the embodiment shown in Figs. 2—3 and Fig. 7, however, the upper pintle 24 comprises the bolt adapted to project through said upper bolt holes 20 and through a suitable hole 50 therefor in the projecting chassis end 36 and to be rigidly secured thereto by the nuts 52 threaded on to each end thereof, and if desired supplementally splined thereto by means of the spline 51 in the chassis and splines 53 in the side plates fitting into the groove 55 on the bolt although if desired the upper end of the side plates may be rigidly secured thereto in any suitable manner. It is thus obvious that in this embodiment the upper end of the side plates 12—14 will be rigidly secured to the projecting end 46 of the chassis and that the spring end 30 pivotally secured to the revolvable lower pintle 22 will be eccentrically revolvably mounted on said thrust bearings 38 within said lower bearing holes 16, thereby permitting a relative swinging movement between the chassis 36 and spring 30 with the bearings 38 working in their respective holes 16 functioning additionally as thrust bearings with their attendant friction to take up some of the shock. It is also apparent that the relative swinging movement between the projecting chassis end and the spring end will be limited by the amount of eccentricity or the amount that the lower pintle 22 is offset from the center of the cylindrical bearings 38. While I have shown the bearings and their holes as truly cylindrical, it is obvious that they may be inclined to form tapered frustro-cones if desired as shown in Fig. 8.

In the embodiment shown in Figs. 4—6 the upper pintle 24 is also eccentrically revolvably mounted in the upper end of the side shackle plates 12—14, thereby providing also a swinging movement between the upper ends of the shackle and the chassis portion 36. It is obvious that in the embodiments shown in Figs. 1–3 and 7 that the nuts 52 hold the side plates together against the chassis portion 36. In the embodiment shown in Figs. 4–6, however, I provide the supplemental bolt 56 suitably provided with the nuts 58 on the threaded ends thereof for holding the side plates together, said bolt being provided with the spacing shoulders 57 to provide free swinging movement of the side plates relative the chassis part 36 and spring 30. In the embodiment shown in Fig. 7 I provide the additional ball bearing means 60 for mounting the lower cylindrical bearings 38 within the bearing holes 16. If desired the lower bearings may be made split or tapered for this purpose for the insertion of the ball bearings 60 between the parts thereof or may be constructed as shown with the split bearing portions 62 partially filling up said holes 16. It is apparent therefore that I have provided a novel type of spring shackle for vehicles constructed of a minimum number of working parts relatively easy to construct with the advantages portrayed above.

It is understood that my invention is not limited to the specific embodiments shown and that various deviations may be made therefrom without departing from the spirit and scope of the appended claims.

What I claim is:

1. In a vehicle spring construction, spaced mounting means mounted on a portion of said vehicle, revolvable thrust bearing means revolvably mounted on each of said mounting means against axial movement thereon and a shackle pintle rigidly and similarly eccentrically mounted on each of said revolvable thrust bearing means adapted to have a spring end pivotally secured thereto.

2. In a vehicle, shackle means, upper and lower thrust bearing means respectively revolvably mounted on the upper and lower ends of said shackle means, an upper pintle secured to a portion of said vehicle and eccentrically mounted on said upper thrust bearing means and a lower pintle secured to a spring end and eccentrically mounted on said lower thrust bearing means.

3. In a spring vehicle shackle, shackle plates having aligned outwardly tapered bearing holes on the inner surface thereof, a pintle, outwardly tapered bearings similarly eccentrically attached to each end of said pintle mounted within said bearing holes whereby said pintle may eccentrically revolve within said bearing holes and means for holding said plates together.

ROBERT STEVENSON.